United States Patent [19]

Nakagawa

[11] Patent Number: 4,709,175

[45] Date of Patent: Nov. 24, 1987

[54] LINEAR PULSE MOTOR

[75] Inventor: Hiroshi Nakagawa, Ise, Japan

[73] Assignee: Shinko Electric Co., Ltd., Tokyo, Japan

[21] Appl. No.: 732,415

[22] Filed: May 9, 1985

[30] Foreign Application Priority Data

May 10, 1984 [JP] Japan .................................. 59-93531

[51] Int. Cl.$^4$ ........................................... H02K 41/00
[52] U.S. Cl. ...................................................... 310/12
[58] Field of Search ..................................... 310/12–14; 318/135

[56] References Cited

U.S. PATENT DOCUMENTS 4,578,622 3/1986 Nakagawa et al. ............... 310/12 X

Primary Examiner—Donovan F. Duggan
Attorney, Agent, or Firm—Kane, Dalsimer, Kane, Sullivan and Kurucz

[57] ABSTRACT

A linear pulse motor which includes: a primary magnetic flux generating unit composed of a pair of cores each having a coil wound therearound and pairs of magnetic poles, each pole being provided at either end portion of a corresponding core; and a scale having a row of first teeth formed therein along a direction of relative travel thereof with respect to the magnetic flux generating unit, the scale and the flux generating unit being disposed so that the scale relatively moves with respect to the primary magnetic flux generating unit by generating magnetic flux in gaps formed between the magnetic poles and the teeth facing to magnetic poles. The pole pieces each include a flat magnetic pole piece member having a head portion and a leg portion and are arranged on a plane with each head portion disposed close to head portions of adjacent pole piece members; and the pole pieces comprise a ferromagnetic thin plate attached to upper faces of the pole piece members, the thin plate being provided in an upper face thereof with pole teeth portions corresponding to the head portions of the pole piece members, each pole teeth portion having second teeth formed at a predetermined pitch in parallel with the first teeth so that the second teeth may face the first teeth.

4 Claims, 11 Drawing Figures

LINEAR PULSE MOTOR

BACKGROUND OF THE INVENTION

The present invention relates to a linear pulse motor.

Linear pulse motors provide high performance as reciprocally movable actuator and hence are widely used for feeding devices in various information peripheral devices such as head feeding devices of the electronic printer and photoelectronic reader. Recently there is a strong need for reduction in dimensions and cost of the linear pulse motor as office automation terminals are being reduced in volume and cost. In addition to these requirements reduction in thickness is required for the pulse motor used for feeding the head of the floppy disc drive.

In view of these requirements, one of the inventors as a coinventor proposed a flat-type linear pulse motor in U.S. Pat. No. 4,578,622 (filed: Oct. 20, 1983) entitled "LINEAR PULSE MOTOR", corresponding to Japanese Patent Application Nos. 57-188843, 57-198658 and 58-220238, of which disclosure is hereby incorporated by reference. In this flat-type linear pulse motor, magnetic pole teeth are formed in the pole piece members. Although this flat-type linear pulse motor fairly meets the requirements of reducing volume and thickness thereof, but it is in practice rather hard to form very small pole teeth in the pole piece members.

Accordingly, it is an object of the present invention to provide a linear pulse motor which is fairly easy in forming pole teeth of the pole pieces as compared to the previously proposed linear pulse motor, thus resulting in reduction in cost of manufacturing pole pieces.

With this and other objects in view, the present invention provides a linear pulse motor which includes: a primary magnetic flux generating unit composed of a pair of cores each having a coil wound therearound and pairs of magnetic poles, each pole being provided at either end portion of a corresponding core; and a scale having a row of first teeth formed therein along a direction of relative travel thereof with respect to the magnetic flux generating unit, the scale and the flux generating unit being disposed so that the scale relatively moves with respect to the primary magnetic flux generating unit by generating magnetic flux in gaps formed between the magnetic poles and teeth facing to the magnetic poles. The pole pieces each include a flat magnetic pole piece member having a head portion and a leg portion and are arranged on a plane with each head portion disposed close to head portions of adjacent pole piece members; and the pole pieces comprise a ferromagnetic thin plate bonded to upper faces of the pole piece members, the thin plate being provided in an upper face thereof with pole teeth portions corresponding to the head portions of the pole piece members, each pole teeth portion having second teeth formed at a predetermined pitch in parallel with the first teeth so that the second teeth may face the first teeth.

The second teeth of the thin plate may be land portions formed by parallel slits through the thin plate.

Alternatively, the second teeth may be parallel ridges formed in the thin plate. This thin plate is rather higher in strength of the pole teeth portions and in adhesive strength with respect to the pole piece members than the slit thin plate.

The thin plate may include two pairs of bonded portions, each bonded portion including a second head portion and a second leg portion corresponding to the head portion and the leg portion of the corresponding pole piece member respectively. Preferably, each second head portion of one pair of the bonded portions is integrally connected to the adjacent second head portion of the other pair by a connecting portion which has a thickness smaller than the height of the second teeth. The provision of the thinner connecting portion reduces leakage of magnetic flux.

DETAILED DESCRIPTION OF THE PREFERRED EMBODIMENTS

Figure 1:
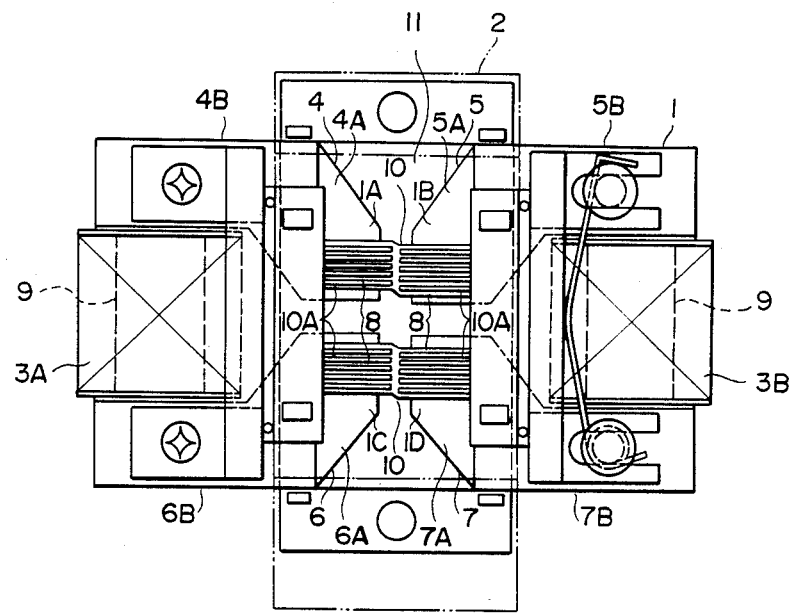
FIG. 1 is a plan view of a linear pulse motor built according to the present invention.
Figure 2:
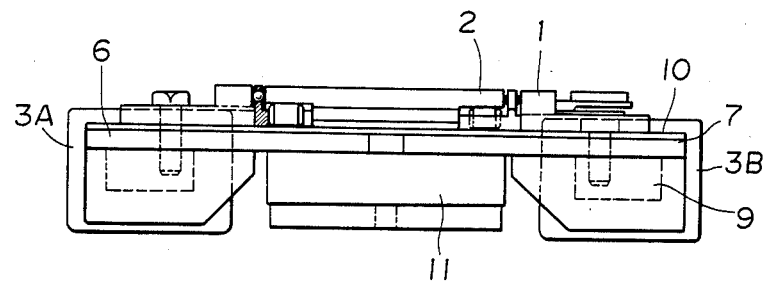
FIG. 2 is a front view of the linear pulse motor in FIG. 1.
Figure 3:
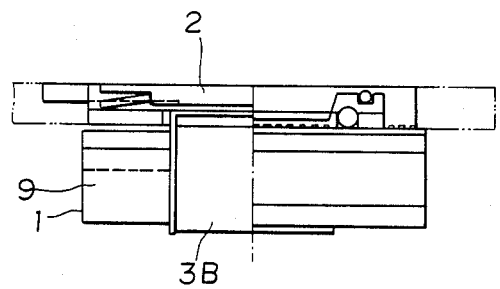
FIG. 3 is a side view, partly in section, of the linear pulse motor in FIG. 1.
Figure 4:
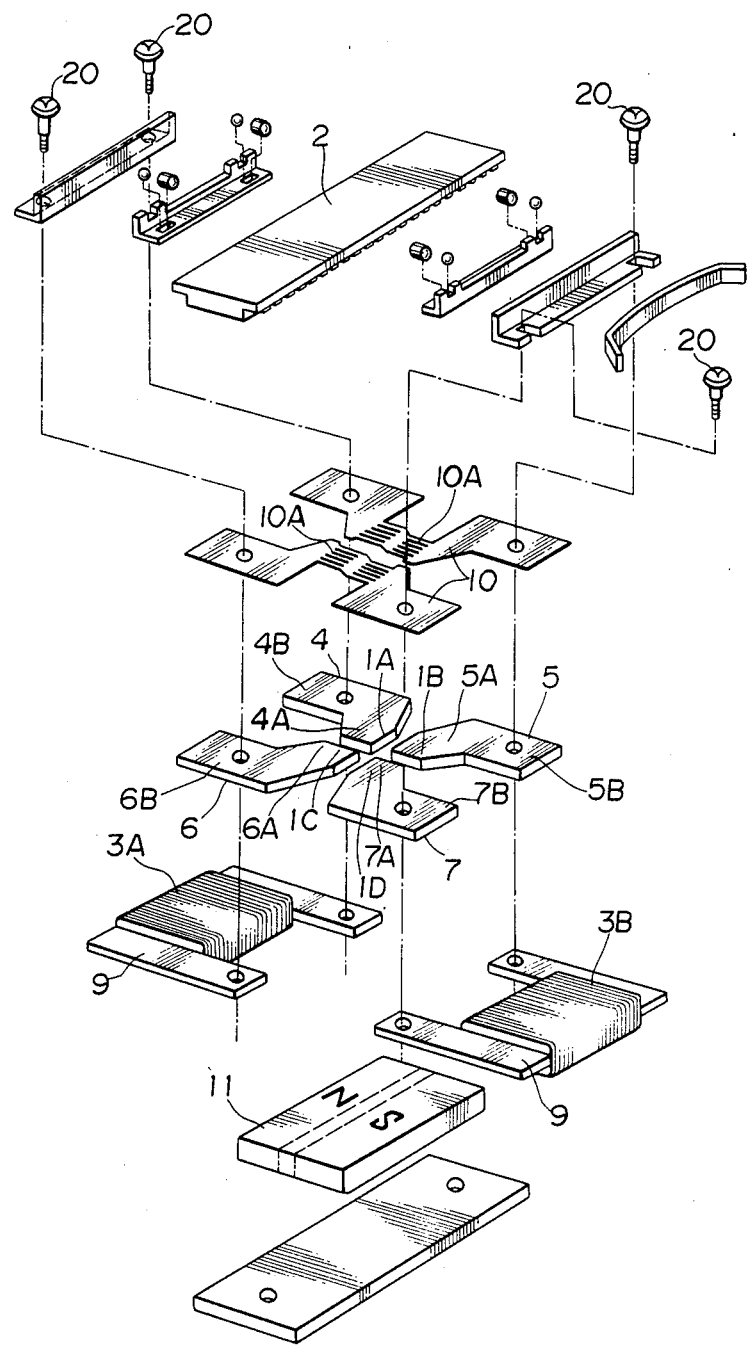
FIG. 4 is an exploded view of the linear pulse motor in FIG. 1.

Referring to FIGS. 1 to 4, there is illustrated a linear pulse motor which includes a primary magnetic flux generating device 1, having four magnetic poles 1A, 1B, 1C and 1D, and a secondary scale 2 linearly movably supported on the magnetic flux generating device 1. This linear pulse motor is operated in the same operating principle as the prior art linear pulse motor previously mentioned. As clearly shown in FIG. 4, flat magnetic pole members 4–7 are used for magnetic poles 1A, 1B, 1C and 1D. Magnetic pole members 4–7 respectively include head portion 4A, 5A, 6A and 7A and leg portions 4B, 5B, 6B and 7B integrally formed with the head portions 4A, 5A, 6A and 7A, respectively. The magnetic pole members 4–7 substantially have a L shape. The leg portions 4B–7B are attached through machine screws 20 to corresponding yoke members 9 around each of which is wound a coil 3A or 3B. The magnetic pole members 4–7 are disposed in a plane to substantially form in a X shape, as shown in FIG. 1, with the head portion 4A–7A disposed close to each other. Each pair of pole pieces 4,6 or 5,7 has coil 3A or 3B disposed between legs thereof. Pole teeth 8 of each magnetic pole are formed by bonding to the upper surfaces of the corresponding magnetic pole piece members 4,5 or 6,7 a thin ferromagnetic plate 10 having slits 10A formed through it at a predetermined pitch. The thin plate 10 may be an iron plate having typically a thickness from about 0.1 to 0.5 mm. For such a thin plate each slit 10A have a width about 0.3 mm and each land portion 13, which is formed by the slits 10A and serve as pole teeth, have a width about 0.2 to 1 mm. Each plate 10 is provided with a pair of L-shaped portions 16 and 17 or 18 and 19 (FIG. 5) bonded by adhesive such as epoxy resin to corresponding pole piece members 4 and 5 or 6 and 7. A permanent magnet 11 having specific polarity is bonded to the lower faces of the magnetic pole pieces 4-7 to be magnetically coupled to magnetic poles 1A, 1B, 1C and 1D.

Figure 5:
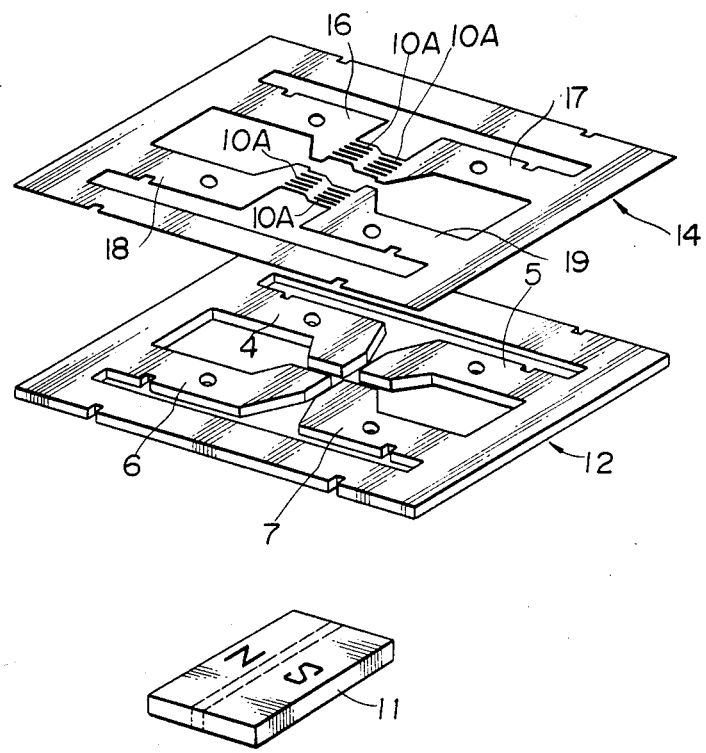
FIG. 5 is a perspective view of a slit plate blank, a pole piece blank and the permanent magnet of the linear pulse motor in FIG. 1.
Figure 6A:
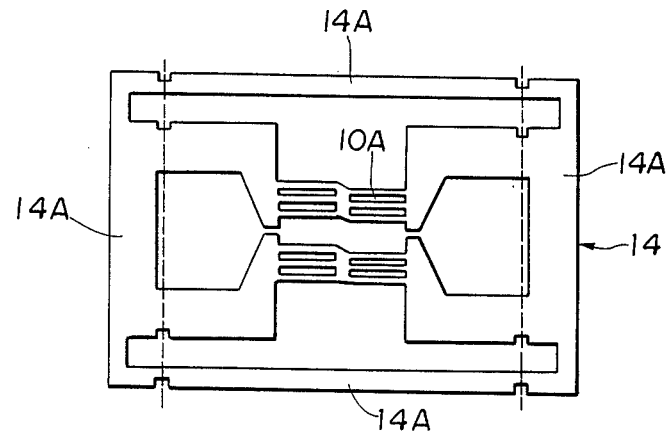
FIG. 6A is a plan view of the slit plate blank in FIG. 5.
Figure 6B:
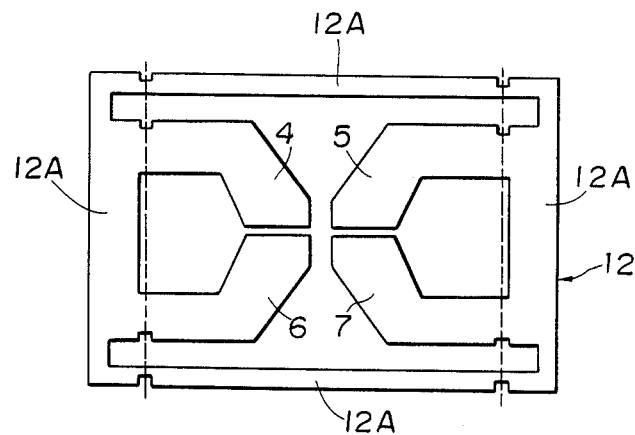
FIG. 6B is a plan view of the pole piece blank in FIG. 5.

In manufacturing the above-mentioned magnet flux generating device 1, a pole piece blank 12 is previously formed, in which the four magnetic pole members 4-7 are, as shown in FIG. 5, integrally formed so that they are disposed at relative positions at which they are to be assembled later to form the magnetic poles. Further, a thin plate blank 14 having two thin plates 10 integrally formed with it is prepared. Each thin plate 10 has two portions corresponding to the head portions 4A, 5A or 6A, 7A of the pole pieces and provided with slits 10A at predetermined pitch. The thin plate blank 14 is bonded to the pole piece blank 12 to form a bonded assembly, which is then attached to the permanent magnet 11 by bonding the latter to the lower face of the pole piece members 4-7 of the pole piece blank 12. Thereafter, unnecessary connecting portions 12A of the pole piece blank 12 and unnecessary connecting portions 14A of the thin plate blank 14 are cut off by cutting along the broken lines shown in FIGS. 6A and 6B. This process of manufacture enables easy and accurate relative positioning of the pole piece members 4-7.

Figure 7:
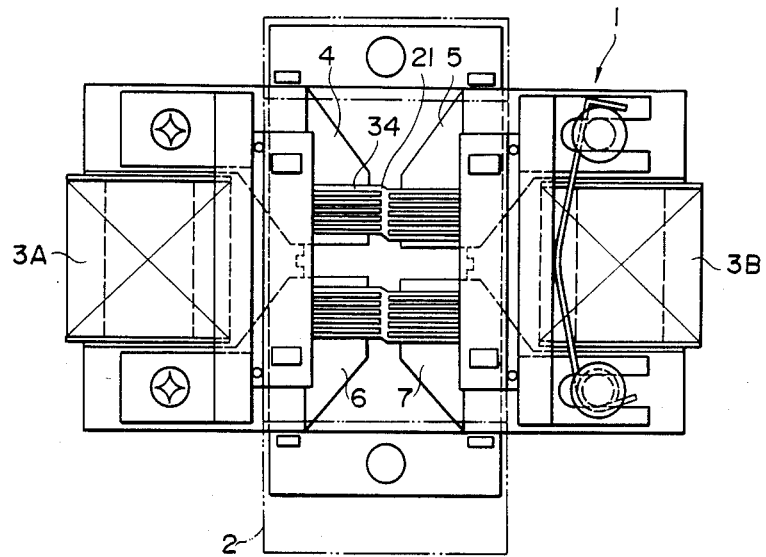
FIG. 7 is a plan view of a linear pulse motor according to a second embodiment of the present invention.
Figure 8:
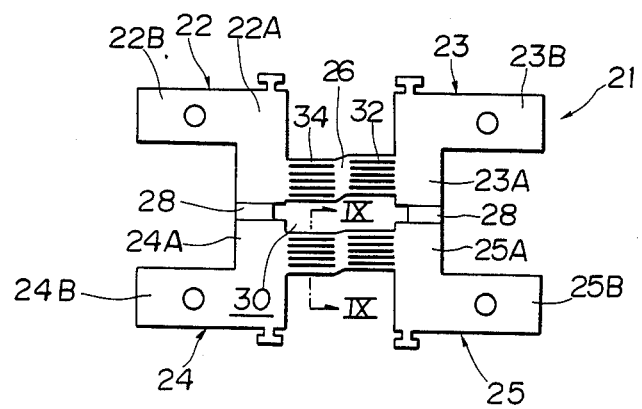
FIG. 8 is a plan view of the thin plate used in the linear pulse motor in FIG. 7.
Figure 9:
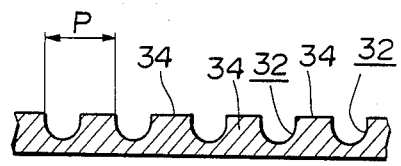
FIG. 9 is an enlarged, partial cross-sectional view taken along the line IX—IX in FIG. 8.

FIGS. 7 to 9 illustrates another embodiment of the present invention in which similar parts are designated by same or like reference characters and explanation thereof is omitted. In this embodiment, a thin plate 21 includes two pairs of "⌐"-shaped bonded portions 22, 23 and 24, 25, each portion having a head 22A, 23A, 24A, 25A and a leg 22B, 23B, 24B, 25B, respectively. The heads 22A, 23A, 24A and 25A of adjacent portions 22-25 are integrally connected by connecting portions 26 and 28 so that the bonded portions 22-25 are disposed in predetermined positions corresponding to the pole piece members 4-7 respectively. The thin plate 21 has substantially a H shape although a through slot 30 is defined by the head portions 22A-25A and the connecting portions 26 and 28. Each head portion 22A-25A is provided in its upper face with a pole teeth portion 27 so that the pole teeth portion 27 may be positioned above the head 4A-7A of the corresponding pole piece member 4-7 when the thin plate 21 is bonded to the pole piece members. The pole teeth portions 27 have each a plurality of, five in this embodiment, equi-spaced parallel grooves 32 to thereby define a plurality of, six in this embodiment, ridges 34 as pole teeth at a pitch of P. The grooves 32 are formed by etching but may be formed by press working, etc. The teeth 34 of adjacent pole teeth portions 27 are shifted ¼ of pitch P to each other. Thus, the pole teeth 34 are, as shown in FIG. 7, arranged to form two teeth rows directed parallel to the travel line of the scale 2. In this embodiment, the thin plate 21 having the four pole teeth portions 27 integrally formed with it is bonded to the upper faces of the pole piece members 4-7 as shown in FIG. 7.

The connecting portions 28 and 28 have a thickness smaller than the head portions 22A-25A of the thin plate 21, in a typical example, about ½ of the thickness of the head portions for reducing leakage of magnetic flux. The connecting portions 28 may be formed by etching or by press working. However, the connecting portions 28 may have the same thickness as the other portions of the thin plate 13.

The thin plate 21 of this embodiment is higher in rigidity and adhesive strength with respect to the pole piece members 4-7 than the thin plates 10 since no slits or slots are formed through the thin plate 21 and since the lower faces of the pole teeth portions 27 are thus flat. Although in the first embodiment, the thin plates 10, particularly, the pole teeth portions 13 may be liable to be deformed or separated from the pole piece members when the connection portions 12A of the pole piece blank 12 and the connecting portions 14A of the thin plate blank 14 are cut off, there is no such problem in the thin plate 21. Furthermore, in this embodiment, no part of the thin plate 21 and the pole pieces 4-7 is cut off, and hence yield of the pole pieces is enhanced.

Figure 10:
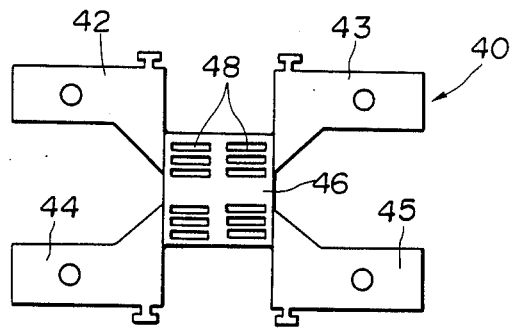
FIG. 10 is a plan view of a modified form of the thin plate in FIG. 8.

FIG. 10 illustrates a modified form of the thin plate 21 shown in FIG. 8. In this modified thin plate 40, bonded portions 42-45 are integrally connected by a cross-shaped connecting portion 46 having a thickness smaller than the bonded portions 42-45. The teeth portions 48 are formed by etching or press working.

In place of the grooves 32 slits may be formed through the thin plates 21 and 40 to form the teeth 34 and 48.

What is claimed is:

1. A linear pulse motor comprising: a primary magnetic flux generating unit comprising a pair of cores each having a coil would therearound and pairs of magnetic pole pieces, each pole piece being provided at either end portion of a corresponding core; a scale having a row of first teeth formed therein along a direction of relative travel thereof with respect to the magnetic flux generating unit, the scale and the flux generating unit being disposed so that the scale moves relative with respect to the primary magnetic flux generating unit be generating magnetic flux in gaps sequentially formed between the magnetic poses and teeth facing to the magnetic poles, the improvements wherein: the pole pieces each comprise a flat magnetic pole piece member having a head portion and a leg portion and are arranged on a plane with each head portion disposed close to head portions of adjacent pole piece members; and the pole pieces comprise ferromagnetic thin plate attached to upper faces of the pole piece members, the thin plate being provided in an upper face thereof with pole teeth portions corresponding to the head portions of the pole piece members, each pole teeth portion having second teeth formed at a predetermined pitch in parallel with the first teeth so that the second teeth face the first teeth and wherein the second teeth are parallel ridges formed in the ferromagnetic thin plate.

2. A linear pulse motor as recited in claim 1, wherein the ridges are defined by parallel grooves formed in the thin plate.

3. A linear pulse motor as recited in claim 2, wherein the thin plate is bonded to the pole piece members and comprises two pairs of bonded portions, each bonded portion including a second head portion and a second leg portion corresponding to the head portion and the leg portion of the corresponding pole piece member respectively; in each pair of the bonded portions the second head portions are integrally connected; second head portions of one pair of the bonded portions are integrally connected to adjacent second head portions of the other pair by a connecting portion having a thickness smaller than the height of the second teeth; and the pole teeth portions are formed in corresponding second head portions of the bonded portions.

4. A linear pulse motor as recited in claim 3, wherein the second head portions of the bonded portions are integrally connected to each other by the connecting portion.

* * * * *